United States Patent [19]
Nishimura et al.

[11] Patent Number: 6,045,049
[45] Date of Patent: Apr. 4, 2000

[54] APPARATUS FOR DETECTING A TAIL END OF A MEMORY CARD IN A MEMORY CARD READER

[75] Inventors: Takeshi Nishimura, Narita; Toshiyasu Ito, Togane, both of Japan

[73] Assignee: Yamaichi Electronics Co., Ltd., Tokyo, Japan

[21] Appl. No.: 09/076,736

[22] Filed: May 13, 1998

[30]   Foreign Application Priority Data

May 19, 1997   [JP]   Japan ..................................... 9-128992

[51] Int. Cl.$^7$ ..................................................... G06K 7/00
[52] U.S. Cl. .......................... 235/486; 235/492; 361/737; 439/489; 200/46
[58] Field of Search .................................... 235/486, 492, 235/451, 439, 482, 483, 485; 361/737, 686, 683; 439/489, 188; 200/46, 542, 573, 283, 284

[56]   References Cited

U.S. PATENT DOCUMENTS

| | | | |
|---|---|---|---|
| 4,419,550 | 12/1983 | Monette | 220/80 R |
| 4,926,032 | 5/1990 | Simamura | 235/486 |
| 4,929,821 | 5/1990 | Kocznar et al. | 235/486 |
| 4,931,622 | 6/1990 | Ohtsuki et al. | 235/486 |
| 5,259,777 | 11/1993 | Schuder et al. . | |
| 5,332,890 | 7/1994 | Kitahara | 235/440 |
| 5,334,034 | 8/1994 | Reichardt et al. | 439/188 |
| 5,714,742 | 2/1998 | Ieda | 235/441 |
| 5,739,516 | 4/1998 | Bricaud . | |
| 5,892,213 | 4/1999 | Ito et al. | 235/486 |
| 5,905,253 | 5/1999 | Ito et al. | 235/486 |

FOREIGN PATENT DOCUMENTS

95/33243   12/1995   WIPO .

*Primary Examiner*—Donald Hajec
*Assistant Examiner*—Diane I. Lee
*Attorney, Agent, or Firm*—Wenderoth, Lind & Ponack, L.L.P.

[57]   ABSTRACT

An apparatus detects a trailing end of a memory card in a memory card reader. The apparatus has a first driven switch element resiliently displaced by the memory card and a second driven switch element resiliently displaced by the first driven switch element. The first driven switch element includes a first resilient contact piece extending in a direction of insertion of the memory card. The second driven switch element includes a second resilient contact piece likewise extending in the direction of insertion of the memory card. The first and second resilient contact pieces are arranged such that they extend along a surface of the memory and face each other in a direction of the thickness of the memory card. After electrode pads arranged on the surface of the memory card inserted into a reader are brought into contact with corresponding contacts arranged in the reader, the first resilient contact piece is pressed by a front end edge portion of the memory card and resiliently displaced in the direction of the thickness of the memory card so as to contact the second resilient contact pieces. The second resilient piece is pressed by the first resilient piece and resiliently displaced in the direction of the thickness of the memory card so as to provide a wiping action on a pressure contacting portion.

22 Claims, 7 Drawing Sheets

APPARATUS FOR DETECTING A TAIL END OF A MEMORY CARD IN A MEMORY CARD READER

BACKGROUND OF THE INVENTION

This invention relates to an apparatus for detecting a trailing end of a memory card in a memory card reader. This detecting apparatus is usable when a memory card containing data is inserted into a given device so that the data contained in the memory card is provided to the device and data from the device is recorded in the memory card.

U.S. Pat. No. 5,334,034 discloses a detecting apparatus in which a memory card is provided on a front end edge thereof with first and second switch elements for the purpose of detecting a trailing end of the memory card.

This apparatus for detecting a trailing end of a memory card has disadvantages. Design of contacts, assembly of the apparatus and its structure for contacting a wiring circuit board are limited, because the apparatus occupies a space for installing terminals of the contacts used for contacting corresponding electrode pads arranged on the memory card.

Also, insertion force for the memory card is too strong, because the switch elements apply a resilient force (discharging force) in an opposite direction with respect to a direction of insertion of the memory card to a front end edge of the memory card. Further, a mechanism is needed for assuredly retaining the position of the trailing end of the memory card against the resilient force.

In a comparable apparatus disclosed by U.S. Pat. No. 5,334,827, first and second switch elements are arranged on one end portion of a memory card. Due to the foregoing arrangement, this apparatus disadvantageously has an enlarged space for insertion of the memory card. In addition, the above apparatus disadvantageously has the switch elements vertically implanted with respect to a direction of the thickness of the memory card so that extending terminals can be brought into electrical connection with a wiring circuit board and a card sensitive portion extends parallel to the surface of the memory card. A space required for the switching elements is large in the direction of the thickness of the memory card and therefore, a thinner design of the apparatus is difficult to obtain.

Furthermore, mutual wiping action between the first switching element and the second switching element cannot be expected and a reliable electrical contact is difficult to obtain as a result of a smaller design for the switch elements.

The present invention has been created in view of the above inconveniences that are inherent in the conventional apparatuses.

SUMMARY OF THE INVENTION

It is, therefore, a general object of the present invention to provide an apparatus for detecting a trailing end of a memory card in a memory card reader, which is capable of obviating the abovementioned inconveniences of the prior art apparatuses.

In order to achieve the above object, there is essentially provided an apparatus for detecting a trailing end of a memory card in a memory card reader comprising a first driven switch element resiliently displaced by the memory card and a second driven switch element resiliently displaced by the first driven switch element. The first driven switch element includes a first resilient contact piece extending in a direction of insertion of the memory card (insertion direction). The second driven switch element includes a second resilient contact piece likewise extending in the direction of insertion of the memory card. The first and second resilient contact pieces are arranged such that they extend along a surface of the memory card and face each other in a direction of a thickness of the memory card (a generally orthogonal direction with respect to the insertion direction). After electrode pads, which are arranged on the surface of the memory card inserted into the reader, are brought into contact with corresponding contacts arranged in the reader, the first resilient contact piece is pressed by a front end edge portion of the memory card and resiliently displaced in the direction of the thickness of the memory card so as to contact the second resilient contact piece under pressure. The second resilient piece is pressed by the first resilient piece and resiliently displaced in the direction of the thickness of the memory card so as to provide a wiping action on a pressure contacting portion.

It is preferred that the first resilient contact piece is provided on a free end portion thereof with a pressure receiving portion that extends beyond the thickness of the front end edge portion of the memory card. The pressure receiving portion is pressed by the front end edge portion of the memory card.

It is also preferred that the first and second resilient pieces are biased to a standby position with resilient forces stored therein.

It is also preferred that the first and second driven switch elements have a first and a second frame, respectively. The first and second resilient contact pieces extend through internal spaces of the first and second frames, respectively, each with one end thereof connected to the first and second frames, respectively and the other end defining a free end portion. The free end portion of the first resilient contact piece is pressed by the front end edge portion of the memory card so as to contact with the free end portion of the second resilient contact piece under pressure.

It is also preferred that the first and second driven switch elements are fixedly press fitted by the frames into a card receiving case forming an apparatus body.

It is also preferred that the card receiving case forming the apparatus body is formed with an upper press-fit slot and a lower press-fit slot which are open at an end face on the trailing end side of the memory card. The frames are press fitted into the upper and lower press-fit slots, respectively, so that the first and second driven switch elements are fixed to the card receiving case.

A more complete disclosure of the invention and many of the attendant advantages thereof will be readily obtained as the same becomes better understood by reference to the following detailed description when considered in connection with the accompanying drawings.

BRIEF DESCRIPTION OF THE DRAWINGS

FIGS. 10A and 10B are sectional views for explaining the action of the first and second driven switch element when the memory card is inserted in the card receiving case, and FIG. 10C is an enlarged side view of an end forming the pressure contacting portion of FIG. 10B.

DETAILED DESCRIPTION OF THE EMBODIMENTS

Figure 1A:
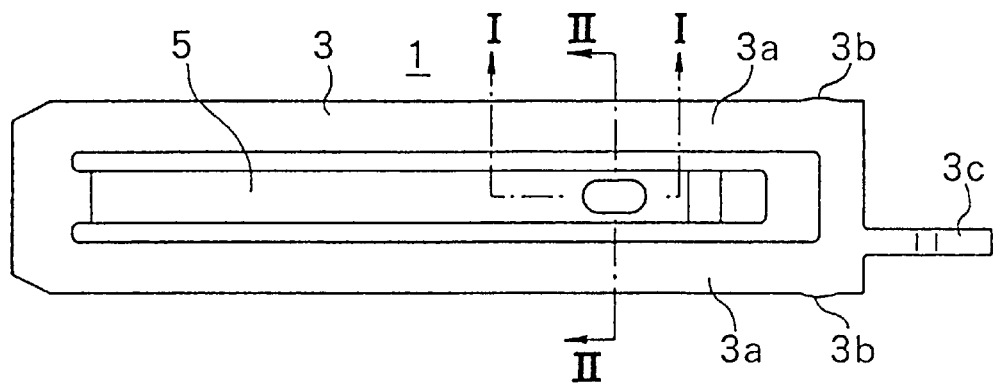
FIG. 1A is a plan view of a first driven switch element.
Figure 1B:
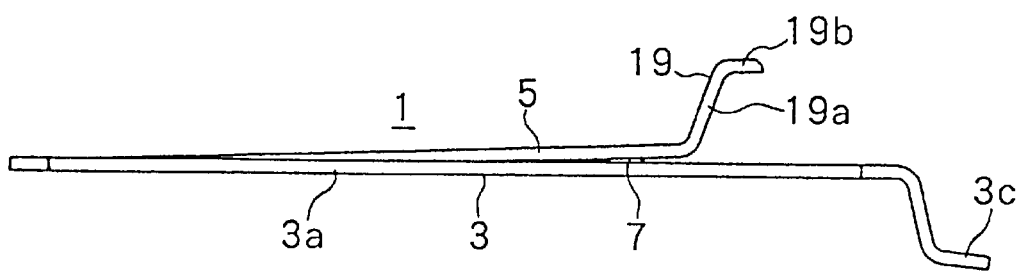
FIG. 1B is a side view of the first driven switch element.
Figure 1C:
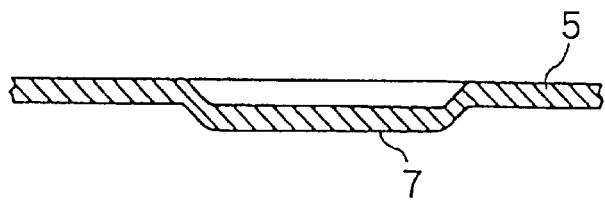
FIG. 1C is a sectional view taken along line I—I of FIG. 1A.
Figure 1D:
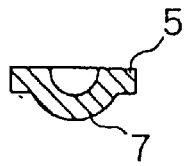
FIG. 1D is a sectional view taken along line II—II of FIG. 1A.

The embodiments of the present invention will now be described with reference to FIGS. 1 through 10. A memory card 10 having a memory element exhibits a generally square configuration as shown in FIG. 3 and is thin. A plurality of electrode pads 11, 12 serve as external contacts for the memory element and are arranged in a single row or plural rows on one surface of the memory card 10.

Reference numeral 9 denotes a card receiving case made of an insulating material. This card receiving case 9 is provided on a given electronic device. The card receiving case 9 includes a card receiving chamber 9a. This card receiving chamber 9a is open at one end face of the card receiving case 9. The memory card 10 is inserted in the card receiving chamber 9a through an opening 9b.

The card receiving case 9 includes a plurality of contacts 13, 14 arranged in such a manner so as to be able to contact the electrode pads 11, 12 of the memory card 10 inserted in the card receiving chamber 9a.

The contacts 13, 14 are implanted in an end wall opposing the card receiving case opening 9b such that the contacts 13, 14 extend from the end wall towards the opening 9b. The contacts 13 are comparatively long and the contacts 14 are comparatively short. In other words, the contacts consist of the comparatively long contacts 13 and the comparatively short contacts 14. They are alternately arranged in an orthogonal direction with respect to a direction of insertion of the memory card 10.

When the memory card 10 is inserted into the card receiving chamber 9a (along an insertion path), the electrode pads 11 in a first row, are brought into contact (under pressure) with the corresponding contacts 13 in the first row, and the electrode pads 12 in a second row are brought into contact (under pressure) with the contacts 14 in the second row.

The contacts 13, 14 each include a resilient contact piece. The resilient contact pieces extend in the direction of insertion (and withdrawal) of the memory card 10 along the surface of the memory card 10. The contacts 13, 14 are each provided on distal ends thereof with pressure contact portions 13a, 14a, respectively. The pressure contact portions 13a, 14a are pressed by the surface of the memory card 10 to deflect the resilient pieces in a direction of a thickness of the memory card 10, so that the contact portions 13a, 14a are brought into contact with the surfaces of the corresponding electrode pads 11, 12 by their restoring force, respectively.

The resilient pieces are each provided on their based end portions with terminal pieces 13b, 14b, respectively. The terminal pieces 13b, 14b extend through the end wall of the card receiving case 9 and project outwardly so as to be able to electrically contact a wiring circuit board, or the like. The memory card 10 is connected to the given electronic device through the electrode pads 11, 12, the contacts 13, 14 and the wiring circuit board such that the memory card 10 can be read.

As shown in FIG. 3, the card receiving case 9 is provided with a card trailing end detecting switch. This switch consists of a first driven switch element 1 (shown in FIG. 1) and a second driven switch element 2 (shown in FIG. 2). Both the switch elements 1, 2 extend along the surface of the memory card 10 and face with each other in the direction of the thickness of the memory card 10.

Figure 4A:
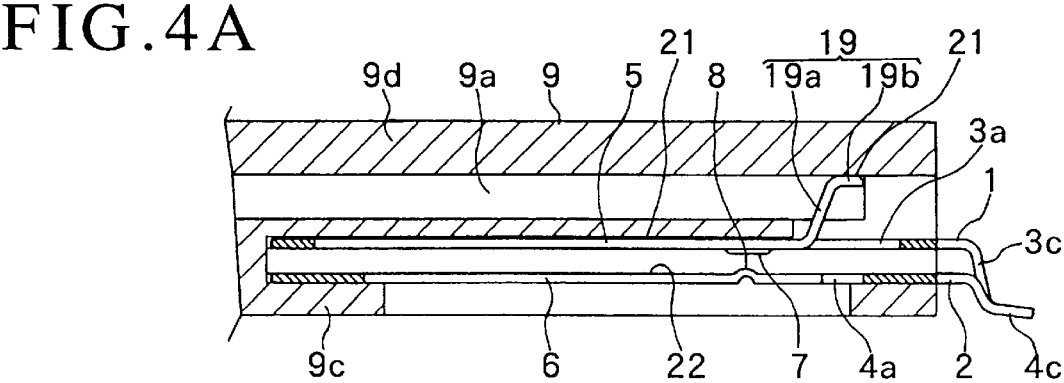
FIGS. 4A–4D are sectional views for explaining a sequential action of the first and the second driven switch element when the memory card is inserted into the card receiving case.
Figure 4B:
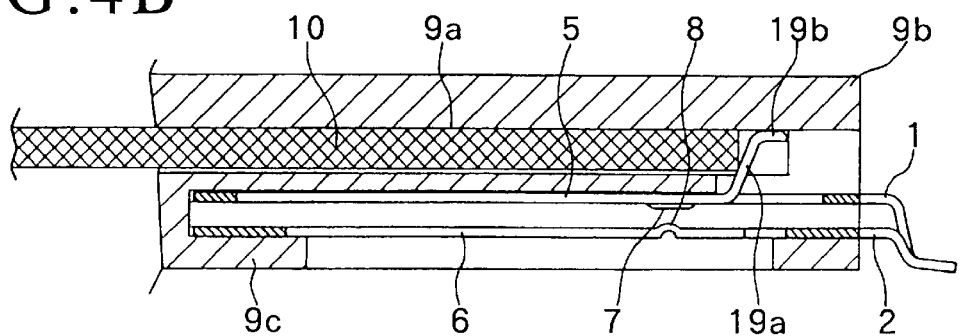
Figure 4C:
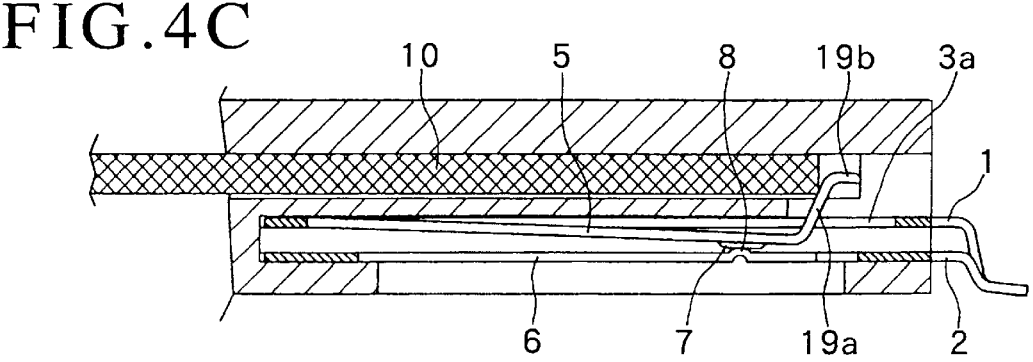
Figure 4D:
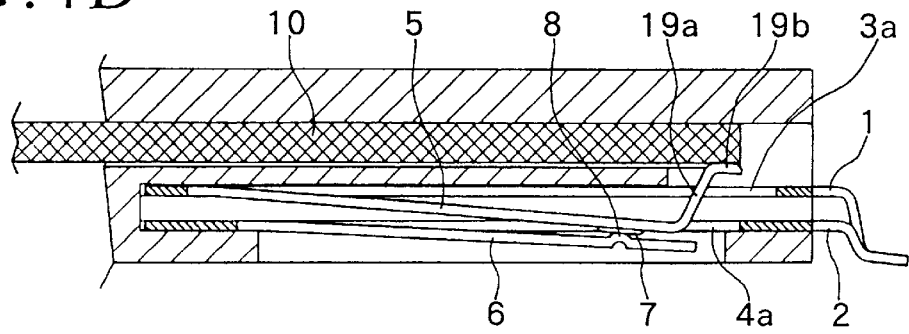
Figure 5:
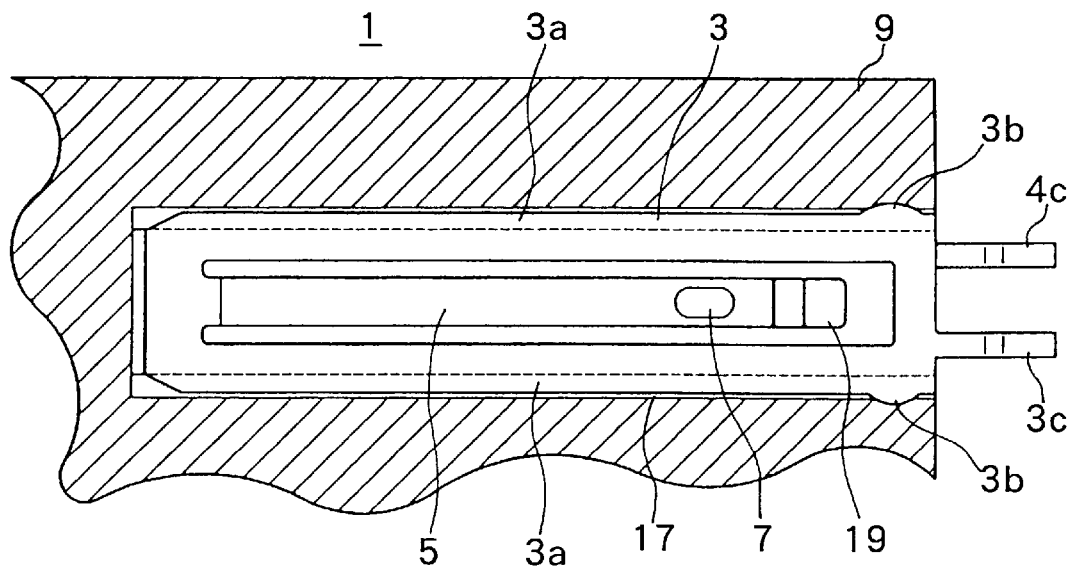
FIG. 5 is a sectional view showing a pressed-in state of the first driven switch element when viewed from above.
Figure 6:
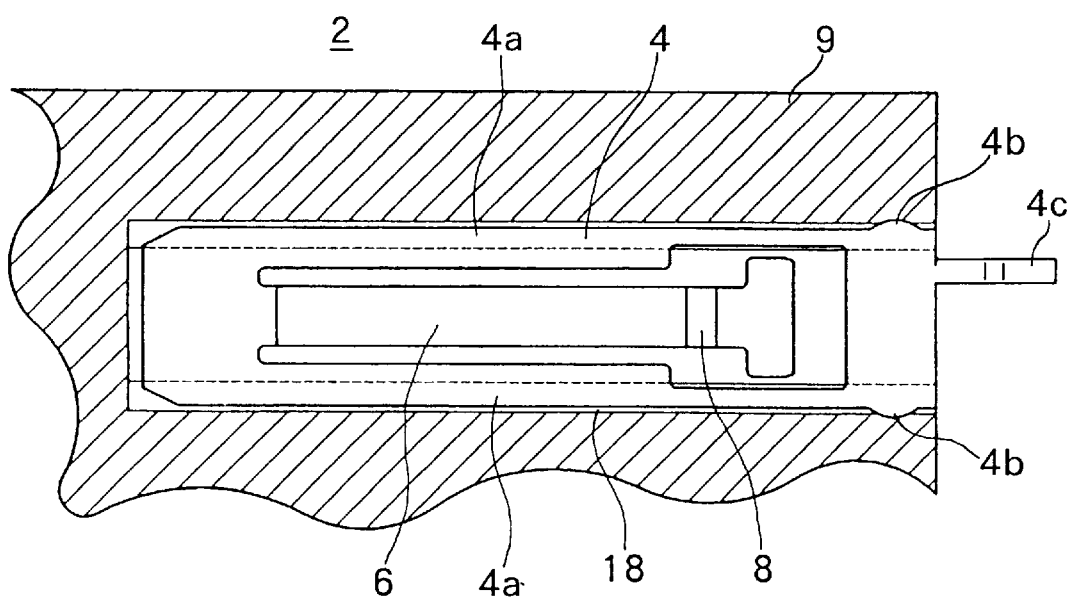
FIG. 6 is a sectional view showing a pressed-in state of the second driven switch element when viewed from above.
Figure 7:
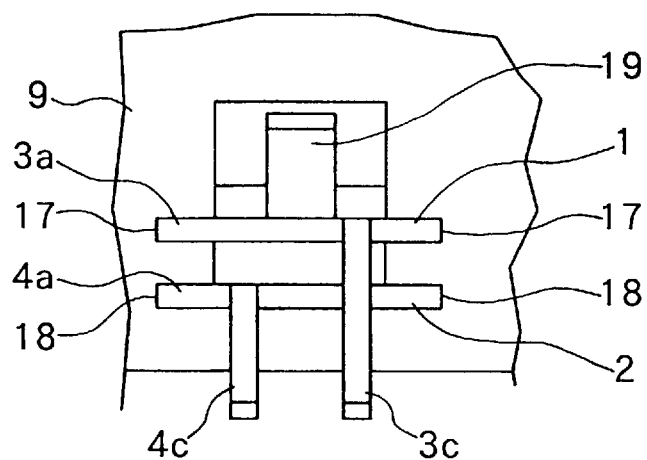
FIG. 7 is a front view showing a pressed-in state of the first and the second driven switch elements.

Specifically, as shown in FIGS. 4, 5 and 6, the first and second driven switch elements 1, 2 include first and second resilient contact pieces 5, 6, respectively. The first and second resilient contact pieces 5, 6 extend along the surface of the memory card 10 in the direction of insertion of the memory card 10, and face each other in the direction of the thickness of the memory card 10. One end for each first and second resilient contact pieces 5, 6 is a fixed end and the other end is a free end. Preferably, the fixed ends of the first and second resilient contact pieces 5, 6 are at a leading end of the memory card 10 and the free ends thereof are at a trailing end of the memory card 10 when the card 10 is inserted.

In other words, the end portions of the first and second resilient contact pieces 5, 6, that are located at the opening 9b, which is an inlet port for the memory card 10, are fixed ends. The first and second resilient contact pieces 5, 6 extend from the fixed ends towards the trailing end of the memory card 10. The ends of the first and second resilient contact pieces 5, 6, which are located at the trailing end of the memory card 10, are free ends.

The first and second driven switch elements 1, 2 include elongated frames 3, 4, respectively. The elongated frames 3, 4 are adapted to support the first and second resilient contact pieces 1, 2, respectively, in a stable manner.

The frames 3, 4 extend, as in the first and second resilient contact pieces 5, 6, in the direction of insertion of the memory card 10 along the surface of the memory card 10. The resilient contact pieces 5, 6 further extend through internal spaces of the frames 3, 4, respectively. The end portions of the first and second resilient contact pieces 5, 6 on the side of the leading end of the memory card 10 are provided as fixed ends, and the end portions of resilient contact pieces 5, 6 of the frames 3, 4 on the trailing end are provided as free ends.

The first and second driven switch elements 1, 2 are fixed at the frames 3, 4 to corner portions of the card receiving case 9 on the trailing end of the memory card 10, and namely, to an inner corner portion of the card receiving chamber 9a. The first and second drive switch elements 1, 2 are arranged at the ends of the rows of the contacts 13, 14, respectively.

As shown in FIGS. 5 to 8, the card receiving case 9 is provided in the corner portion of a bottom plate 9c or a top plate 9d thereof on the trailing end of the memory card 10 with two slots 17, 18. The two slots 17, 18 are arranged in two steps in the direction of the thickness of the memory card 10. Each of the slots 17, 18 consists of a pair of left and right slot portions. The pair of left and right slot portions are mutually spaced apart and extend in a parallel relationship. The slots 17, 18 are opened outwardly at the end wall of the card receiving case 9 on the trailing end of the memory card 10. The frames 3, 4 are press fitted into the slots 17, 18, respectively, from the openings.

Frame pieces 3a, 4a of the frames 3, 4 which extend in the direction of insertion of the memory card 10, are press fitted into the slots 17, 18, respectively, and the first and second driven switch elements 1, 2 are fixed to the card receiving case 9.

The frame pieces 3a, 4a are provided at their end portions with arcuate projections 3b, 4b respectively. The arcuate projections 3b, 4b project sidewardly. When the frame pieces 3b, 4b are pressed fitted into the slots 17, 18, respectively, the projections 3b, 4b stick into the inner walls of the slots 17, 18, respectively, so that the fixing strength is enhanced. Accordingly, the frames 3, 4 of the first and second driven switch elements 1, 2 are mostly relatively loosely inserted into the slots 17, 18, respectively. At the end of insertion of the frames 3, 4, the projections 3b, 4b stick into the inner walls of the slots 17, 18, respectively.

The frames 3, 4 are provided on the end portions on the trailing end of the memory card 10 with terminal pieces 3c, 4c, respectively. The terminal pieces 3c, 4c project in the same direction as the terminal pieces 13b, 14b so as to be able to electrically contact the wiring circuit board.

When the frame pieces 3a, 4a of the frames 3, 4 are retained in the slots 17, 18 over the entire length thereof, respectively, the first and second resilient contact pieces 5, 6 and the terminal pieces 3c, 4c are supported in the card receiving case 9 in an extremely stable manner. Further, the first and second resilient contact pieces 5, 6 are deflected by the pressing force of the memory card 10 in a stable manner.

After the memory card 10 is inserted into the reader (namely, in the card receiving case 9), the electrode pads 11, 12 arranged on the surface of the memory card 10 contact the contacts 13, 14, respectively. The front end edge portion of the memory card 10 resiliently displaces the contacts 13, 14 in the direction of the thickness of the memory card 10. The insertion of the memory card 10 causes the free end portion of the first resilient contact piece 5 to contact the free end portion of the second resilient contact piece 6. The second resilient contact piece 6 is resiliently displaced in the direction of the thickness of the memory card 10 by the contact pressure of the first resilient piece 5. As a consequence, a wiping action occurs on pressure contact portions.

In other words, the memory card 10 causes the first driven switch element 1 to be deflected at the front end portion of the memory card 10 in the direction of the thickness of the memory card 10 so as to contact the second driven switch element 2. This contact pressure causes the second driven switch element 2 to be displaced in the direction of the thickness of the memory card 10. Since the first and second driven switch elements 1, 2 are deflected together while maintaining the contact pressure relationship between the first driven switch element 1 and the second driven switch element 2, the wiping action occurs at the pressure contact portions.

Figure 2A:
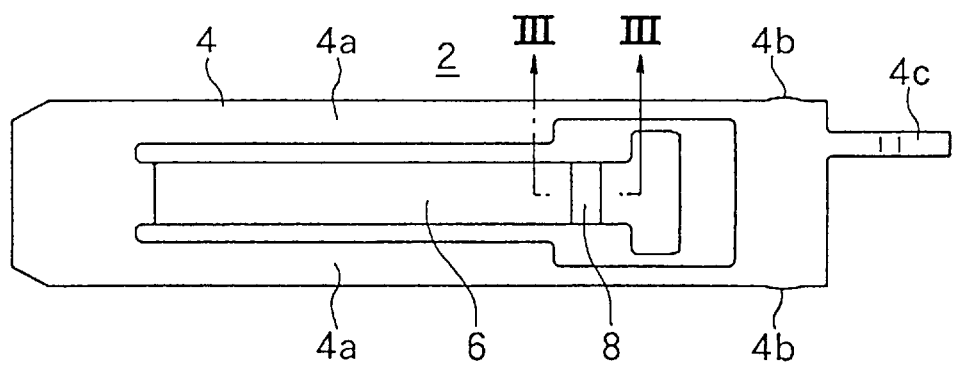
FIG. 2A is a plan view of a second driven switch element.
Figure 2B:
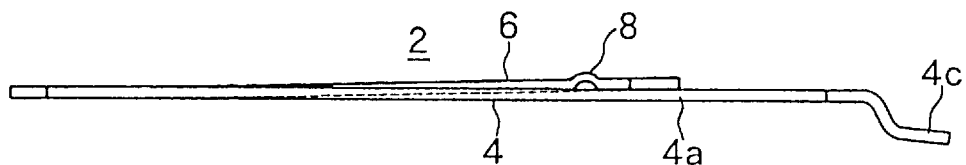
FIG. 2B is a side view of the second driven switch element.
Figure 2C:
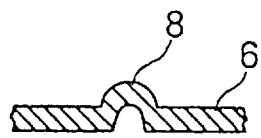
FIG. 2C is a sectional view taken along line III—III of FIG. 2A.
Figure 3:
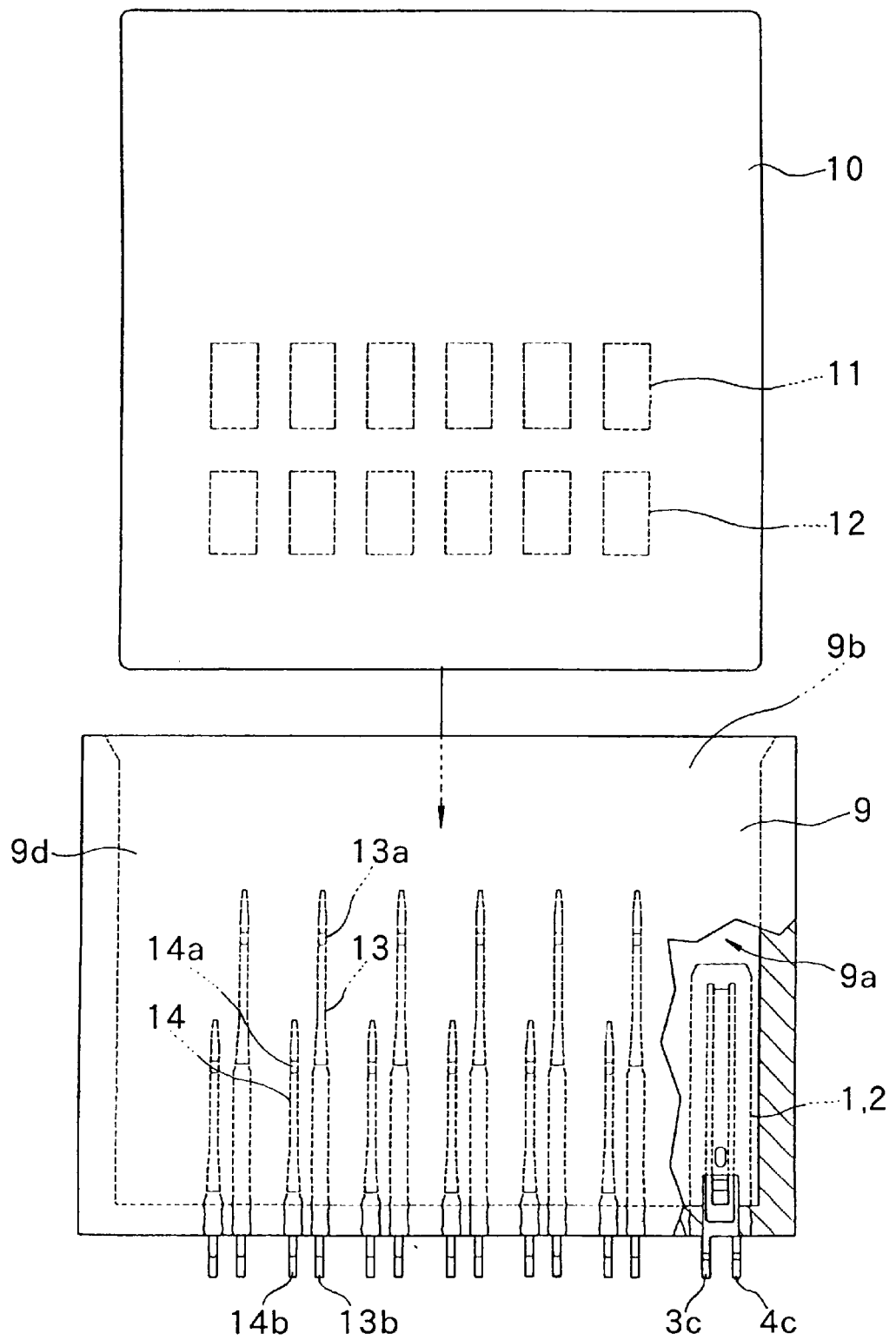
FIG. 3 is a plan view of a memory card and a card receiving case.
Figure 9:
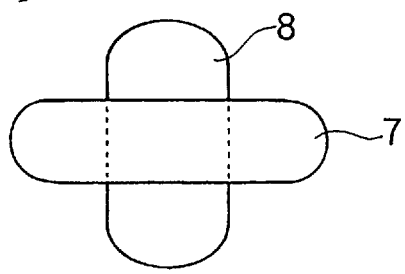
FIG. 9 is a plan view showing a mutually-crossing state of ribs at pressure contacting portions of the first and second resilient contact pieces.

As shown in FIGS. 1 and 2, in order to assuredly obtain the wiping effect at the pressure contacting portions, the first and second resilient contact pieces 5, 6 are formed on free end portions thereof with ribs 7, 8, respectively. The rib 7 or 8 of the first or the second resilient contact pieces 5 or 6 extends in a longitudinal direction with respect to the contact piece 5 or 6 (in the direction of insertion of the memory card 10), while the remaining rib 7 or 8 extends in a short direction of the contact piece 5 or 6 (in a direction orthogonal to the direction of insertion of the memory card 10). Accordingly, as shown in FIG. 9, the ribs 7, 8 contact each other and the wiping action effectively occurs at this contact location.

As shown in FIG. 1, the first resilient contact piece 5 is provided at the free end portion thereof with a pressure receiving portion 19, which is pressed by the leading end edge portion of the memory card 10. This pressure receiving portion 19 extends beyond the thickness of the front end edge portion of the memory card 10.

As shown in FIGS. 4A, 4B and 4C, the front end edge portion of the memory card 10 presses the pressure receiving portion 19 to cause the first resilient contact piece 5 to be deflected in the direction of the thickness of the memory card 10, and thereby cause the second resilient contact piece 6 to be deflected in the direction of the thickness of the memory card 10, so that the abovementioned wiping action can be obtained.

The pressure receiving portion 19 of the first resilient contact piece 5 includes an inclination portion 19a inclining forwardly towards the direction of insertion of the memory card 10, and a generally horizontal top piece 19b formed on an end portion of the inclination portion 19a.

As shown in FIGS. 4B, 4C and 4D, in accordance with the progress of the insertion of the memory card 10, the front end edge portion of the memory card 10 presses the inclination portion 19a to cause the first resilient contact piece 5 to be resiliently deflected in the direction of the thickness of the memory card 10. After the memory card 10 passes over the inclination portion 19a, as shown in FIG. 4D, the top piece 19b contacts the surface of the memory card 10. In that state, insertion of the memory card 10 is finished.

As shown in FIG. 4D, when the memory card 10 is fully inserted, the pressure receiving portion 19 moves from the front end edge portion of the memory card 10 to the surface of the memory card 10 and contacts the surface of the memory card 10. By doing so, a final pressure contacting state of the first and second resilient contact pieces 5, 6 is realized.

As one suitable example, the first resilient contact piece 5 is pressed by the surface of the memory card 10 where the electrode pads 11, 12 are arranged. In other words, the first and second driven switch elements 1, 2 and the contacts 13, 14 are disposed along the same surface of the memory card 10.

Figure 10A:
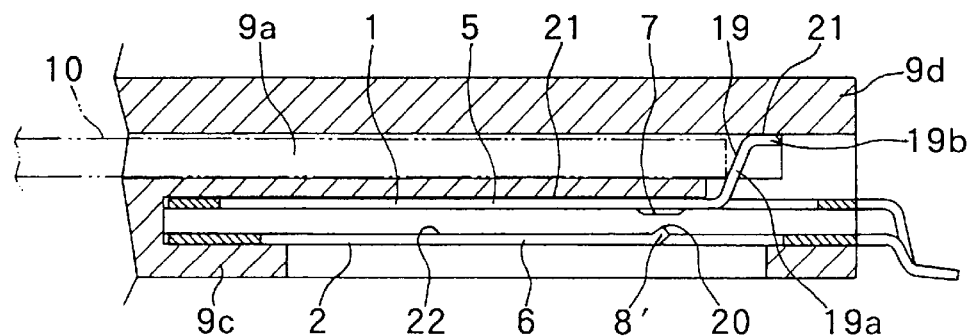
FIGS. 10A–10C show another example of pressure contacting portions of the first and second resilient contact pieces.
Figure 10B:
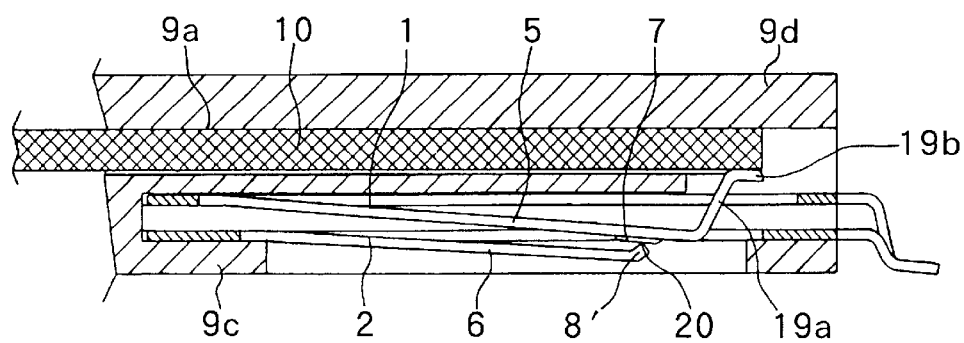
Figure 10C:
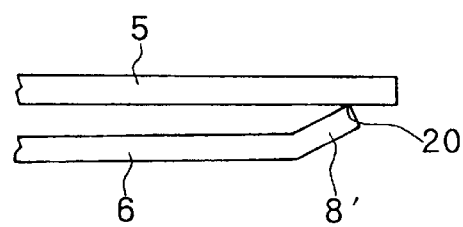

FIG. 10 shows another example of the pressure contact portion between the first and second resilient contact pieces 5, 6. All the remaining constitution of the first and second driven switch elements 1, 2 and the structure for actuating the first and second driven switch elements 1, 2 are the same as those of FIGS. 1 to 8.

FIGS. 1 to 9 show a contacting structure in which one pair of semi-cylindrical ribs 7, 8 are crossed. FIG. 10 shows a contacting structure in which the free end portion of the second resilient contact piece 6 of the second driven switch element 2 is bent slantwise towards the first resilient contact piece 5 of the first driven switch element 1 to form a pressure contact portion 8'. A forward end edge 20 of the pressure contact portion 8' is brought into contact with the surface of the first resilient contact piece 5.

As shown in FIGS. 10A and 10B, when the front end edge portion of the memory card 10 presses the pressure receiving portion 19 of the first resilient contact piece 5, the first and second resilient contact pieces 5, 6 move together in their mutually contacted states in the direction of the thickness of the memory card 10 against the resilient force. A favorable wiping action occurs between the edge portion 20 of the second resilient contact piece 6 and the upper surface of the free end portion of the second resilient contact piece 6, and thereby ensures a reliable electrical contacting relationship. It is also accepted that the surface of the first resilient contact piece 5 is formed thereon with the rib 7, and the edge 20 slides on the ridge line of the rib 7.

It is also accepted that the inclined pressure contact portion 8' and the edge portion 20 can be formed in the first resilient contact piece 5 and brought into contact with a surface of the second resilient contact piece 6. With respect to the first and second driven switch elements, the resilient contact pieces 5, 6 and the frames 3, 4 are formed by blanking a flat plate as an integral member, and a blanking plate surface faces an upper surface of the memory card 10.

Preferably, as shown in FIGS. 4A and 10A, the first resilient contact piece 5 abuts a bottom plate 9c or a top plate 9d of the card receiving case 9 so that the contact piece 5 has a resilient force stored therein. Then, the first resilient contact piece 5 is pressed by the memory card 10.

Another alternative is that the top piece 19b forming the pressure receiving portion 19 of the first resilient piece 5 abuts with the top plate 9d or the bottom plate 9c so that the top piece 19b has a resilient force stored therein. Then, it is pressed by the memory card 10 so as contact the second resilient contact piece 6. Reference numeral 21 denotes an abutment portion with the case 9 by the first resilient contact piece 5 and the top piece 19b.

Figure 8:
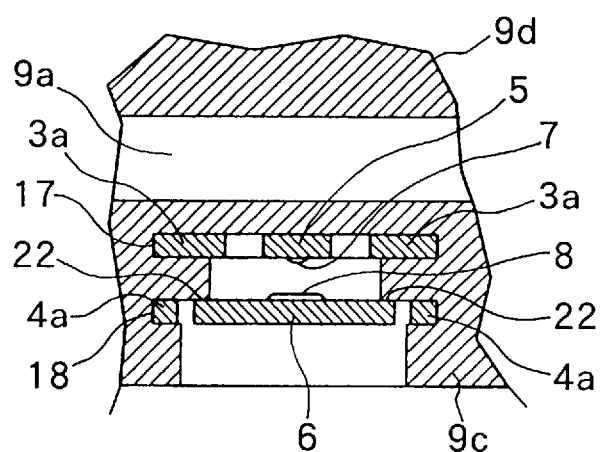
FIG. 8 is a cross-sectional view of FIG. 7.

Likewise, the second resilient contact piece 6 also abuts a part of the card receiving case 9 so that the contact piece 6 has a resilient force stored therein. For example, as shown in FIG. 8, an edge portion of the second resilient contact piece 6 abuts the wall defining the slot 8 so that the contact piece 6 has a resilient force stored therein. Reference numeral 22 denotes an abutment portion between the second resilient contact piece 6 and the card receiving case 9.

The first and second resilient pieces 5, 6 abut a part of the card receiving case 9 so that they are preloaded. By doing so, the positions of the first resilient piece and second resilient contact pieces 5, 6 relative to each other and the positions of the first and second resilient pieces 5, 6 relative to the memory card 10 are properly maintained. In addition, the first resilient contact piece 5 is pressed against the second resilient contact piece 6 with the resilient force stored therein. By doing so, a larger pressure contacting force can be obtained with a reduced amount of displacement and the wiping action at the pressure contact area is also increased.

According to the present invention, the card case can be formed with a thinner design. In addition, a proper resilient displacement of the switch elements and a proper pressure contacting force can be obtained with a comparatively small card insertion force. At the same time, the switch elements do not produce a force component for pressing the memory card in a direction of withdrawal of the memory card. Since the first and second driven switch elements are deflected in their pressure contacting condition, a better wiping effect is obtained, and thus enables a reliable contact relationship. Further, the first and second resilient contact pieces subjected to the pressure contact relationship can be supported in place by the frames in a stable manner.

It is to be understood that the form of the invention herewith shown and described is to be taken as the preferred embodiment of the same, and that various changes in the shape, size and arrangement of parts may be made without departing from the spirit of the invention or the scope of the claims.

What is claimed is:

1. An apparatus for detecting a trailing end of a memory card in a memory card reader, comprising:

a first driven switch element resiliently displaceable by the memory card when the memory card is inserted in an insertion direction along an insertion path, wherein said first driven switch element includes a first frame with a first internal space and a first resilient contact piece extending in the insertion direction through said first internal space, wherein said first resilient contact piece has a first free end portion and a first fixed end portion, and wherein said first fixed end portion is connected to said first frame;

a second driven switch element which is resiliently displaced by said first driven switch element when said first driven switch element is resiliently displaced by the memory card, wherein said second driven switch element includes a second frame with a second internal space and a second resilient contact piece extending in the insertion direction through said second internal space, wherein said second resilient contact piece has a second free end portion and a second fixed end portion, and wherein said second fixed end portion is connected to said second frame;

wherein said first and second resilient contact pieces are arranged such that they extend along a surface of the memory card when the memory card is inserted along the insertion path and face each other in a direction generally orthogonal with respect to the insertion path; and wherein said first free end portion of said first resilient contact piece is arranged so as to be pressed by a front edge portion of the memory card when the memory card is inserted along the insertion path and resiliently displaced in a direction generally orthogonal with respect to the insertion path so as to contact said second free end portion of said second resilient contact piece under pressure such that said second free end portion of said second resilient contact piece is resiliently displaced in a direction generally orthogonal with respect to the insertion path so as to provide a wiping action at a contact portion between said first and second resilient contact pieces.

2. An apparatus according to claim 1, further comprising an apparatus body comprising a card receiving case, wherein said first driven switch element is fixedly press fitted in said card receiving case, and wherein said second driven switch element is fixedly press fitted in said card receiving case.

3. An apparatus according to claim 2, wherein said card receiving case has a card receiving opening for receiving the memory card, an upper press-fit slot with an upper opening provided at a side of said card receiving case which is opposite from said card receiving opening and a lower press-fit slot with a lower opening provided at said side of said card receiving case which is opposite from said card receiving opening, and wherein said first and second frames are respectively fixedly press fitted in said upper and lower press-fit slots.

4. An apparatus according to claim 1, wherein said first resilient contact piece has a pressure receiving portion provided on said first free end portion and arranged to extend above the front edge portion of the memory card when the memory card is inserted along the insertion path but before the front edge portion of the memory card presses the pressure receiving portion.

5. An apparatus according to claim 4, wherein said first and second resilient pieces are provided so that each has a resilient force stored therein at a standby position.

6. An apparatus according to claim 1, wherein said first driven switch element has a first pair of arcuate projections provided on said first frame, and wherein said second driven switch element has a second pair of arcuate projections provided on said second frame.

7. An apparatus for detecting a trailing end of a memory card, comprising:

a first driven switch element resiliently displaceable by the memory card when the memory card is inserted in an insertion direction along an insertion path, wherein said first driven switch element includes a first resilient contact piece extending in the insertion direction, wherein said first resilient contact piece has a first fixed end portion and a first free end portion, and wherein said first free end portion includes a pressure receiving portion for contacting the memory card when the memory card is inserted and a first rib provided between said pressure receiving portion and said first fixed end portion;

a second driven switch element which is resiliently displaced by said first driven switch element when said first driven switch element is resiliently displaced by the memory card, wherein said second driven switch element includes a second resilient contact piece extending in the insertion direction, and wherein said second resilient contact piece has a second fixed end portion and a second free end portion, and wherein said second free end portion has a second contact portion for contacting said first rib when said first driven switch element is resiliently displaced by the memory card;

wherein said first and second resilient contact pieces are arranged such that they extend along a surface of the memory card when the memory card is inserted along the insertion path and face each other in a direction generally orthogonal with respect to the insertion path; and wherein said pressure receiving portion of said first resilient contact piece is arranged so as to be pressed by a front edge portion of the memory card when the memory card is inserted along the insertion path and said first resilient contact piece is resiliently displaced in a direction generally orthogonal with respect to the insertion path such that said first rib contacts said second contact portion of said second resilient contact piece under pressure such that said second free end portion of said second resilient contact piece is resiliently displaced in a direction generally orthogonal with respect to the insertion path so as to provide a wiping action between said first rib and said second contact portion.

8. An apparatus according to claim 7, wherein said second contact portion of said second driven switch element includes a second rib.

9. An apparatus according to claim 8, wherein said first rib and said second rib are oriented in a crossed relationship with respect to one another when contacting one another.

10. An apparatus according to claim 7, wherein said second contact portion of said second driven switch element includes a pressure contact portion inclined towards said first resilient contact piece in the insertion direction.

11. An apparatus according to claim 7, wherein said pressure receiving portion includes an inclination portion inclined away from said second driven switch element in the insertion direction and a horizontal top piece provided at an end of said inclination portion farthest away from said second driven switch element.

12. An apparatus according to claim 7, further comprising a card receiving case having a card receiving chamber with an opening for receiving the memory card, and wherein said first and second driven switch elements are provided in said card receiving case.

13. An apparatus according to claim 12, wherein said card receiving case has a top plate provided above said card receiving chamber and a bottom plate provided below said card receiving chamber.

14. An apparatus according to claim 13, wherein said bottom plate has a first pair of slots and a second pair of slots provided therein, and wherein said first driven switch element is provided in said first pair of slots and said second driven switch element is provided in said second pair of slots.

15. An apparatus according to claim 7, wherein said first driven switch element includes a first frame connected to said first fixed end portion.

16. An apparatus according to claim 15, wherein said first frame has a first internal space, and wherein said first resilient contact piece extends through said first internal space in the insertion direction.

17. An apparatus according to claim 15, wherein said first driven switch element has a terminal piece extending from said first frame for connecting said first frame to a circuit board.

18. An apparatus according to claim 15, wherein said first driven switch element has a pair of arcuate projections extending from said first frame.

19. An apparatus according to claim 7, wherein said second driven switch element includes a second frame connected to said second fixed end portion.

20. An apparatus according to claim 19, wherein said second frame has a second internal space, and wherein said second resilient contact piece extends through said second internal space in the insertion direction.

21. An apparatus according to claim 19, wherein said second driven switch element has a terminal piece extending from said second frame for connecting said second frame to a circuit board.

22. An apparatus according to claim 19, wherein said second driven switch element has a pair of arcuate projections extending from said second frame.

* * * * *